United States Patent
Yu et al.

(10) Patent No.: US 7,578,686 B2
(45) Date of Patent: Aug. 25, 2009

(54) MEMORY CARD CONNECTOR WITH IMPROVED SWITCH CONTACTS FOR STABLY DETECTION OF CARD INSERTION OR REMOVAL

(75) Inventors: Jian-Fei Yu, Kunshan (CN); Qi-Jun Zhao, Kunshan (CN); Hua Yin, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/316,087

(22) Filed: Dec. 8, 2008

(65) Prior Publication Data

US 2009/0149047 A1 Jun. 11, 2009

(30) Foreign Application Priority Data

Dec. 6, 2007 (CN) .................. 2007 2 0131269

(51) Int. Cl.
*H01R 29/00* (2006.01)
(52) U.S. Cl. .................................................. 439/188
(58) Field of Classification Search .............. 439/188, 439/630, 159
See application file for complete search history.

(56) References Cited

U.S. PATENT DOCUMENTS

| 5,013,255 | A | * | 5/1991 | Juret et al. | ............ 439/188 |
| 5,370,544 | A | * | 12/1994 | Reichardt et al. | ...... 439/188 |
| 6,132,229 | A | * | 10/2000 | Wu | ..................... 439/188 |
| 6,557,761 | B1 | | 5/2003 | Oya et al. | |
| 6,816,386 | B2 | * | 11/2004 | Oguchi et al. | ........ 439/188 |
| 7,004,774 | B2 | * | 2/2006 | Chia-Chen | ............. 439/188 |
| 7,309,245 | B2 | * | 12/2007 | Sadatoku | ............... 439/159 |

FOREIGN PATENT DOCUMENTS

TW M288730 3/2006

\* cited by examiner

*Primary Examiner*—Tho D Ta
(74) *Attorney, Agent, or Firm*—Wei Te Chung

(57) ABSTRACT

A memory card connector includes an insulative housing and a plurality of contacts retained in the insulative housing and a pair of switch contacts. The insulative housing defines a card receiving cavity for receiving a memory card. The pair of switch contacts are of a first status when the memory card is located in a deepest insertion position of the card receiving cavity, and the pair of switch contacts are of a second status different from the first status when the memory card is located in a final working position.

17 Claims, 10 Drawing Sheets

MEMORY CARD CONNECTOR WITH IMPROVED SWITCH CONTACTS FOR STABLY DETECTION OF CARD INSERTION OR REMOVAL

BACKGROUND OF THE INVENTION

1. Field of the Invention

This invention generally relates to a memory card connector, and more particularly to a memory card connector with improved switch contacts which can give changed signals when the memory card is inserted into or removes from the memory card connector.

2. Description of Related Art

U.S. Pat. No. 6,557,761 B1 discloses a memory card connector includes an insulative housing defining a card receiving space, a plurality of contacts with contact portions extending into the card receiving space and a pair of switch contacts at the rear of the card receiving space for detecting insertion of a memory card. The switch contacts include a first switch contact and a second switch contact. The first switch contact includes a spring arm extending into the card receiving space and a first contact portion extending from the spring arm. The second switch contact includes a second contact portion detachably for mating with the first contact portion along a vertical direction determined by insertion of the memory card.

In detail, when the memory card is not inserted into the card receiving space, the first contact portion and the second contact portion are separated from each other and the switch contacts are in the "off" state. When the card is inserted into the card receiving space, the spring arm is driven by a front end of the memory card and the first and the second contact portions engage with each other as a result that the switch contacts are in the "on" state. However, such switch contacts arrangement may have a disadvantage because there is no signal changed when the memory card originally abuts against the spring arm and the memory card reaches its final working position. As a result, the switch contacts can only detect whether there is a memory card inserted into the memory card connector or not, but can't detect when the memory is located at its working position. It is easy to understand that when the memory card is removed from the card receiving space, the switch contacts only indicate from "on" state directly to "off" state. It can't give any indications that the memory card is going to withdraw. Maybe when the memory card is going to withdraw, there simultaneously occurs data transmission between the memory card and an electronic device. Under this condition, information or data of the memory card is easy to lost.

Hence, it is desired to have a memory card connector solving the problems above.

BRIEF SUMMARY OF THE INVENTION

A memory card connector includes an insulative housing, a plurality of contacts retained in the insulative housing, a pair of switch contacts and a card ejection mechanism mounted on the insulative housing. The insulative housing defines a card receiving cavity for receiving a memory card. The contacts include contact portions protruding to the card receiving cavity. The pair of switch contacts are located at the rear of the card receiving cavity and include a first switch contact and a second switch contact detachably engaging with each other determined by insertion depths of the memory card. The pair of switch contacts are of a first status when the memory card is located in a deepest insertion position of the card receiving cavity, and the pair of switch contacts are of a second status different from the first status when the memory card is located in a final working position.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
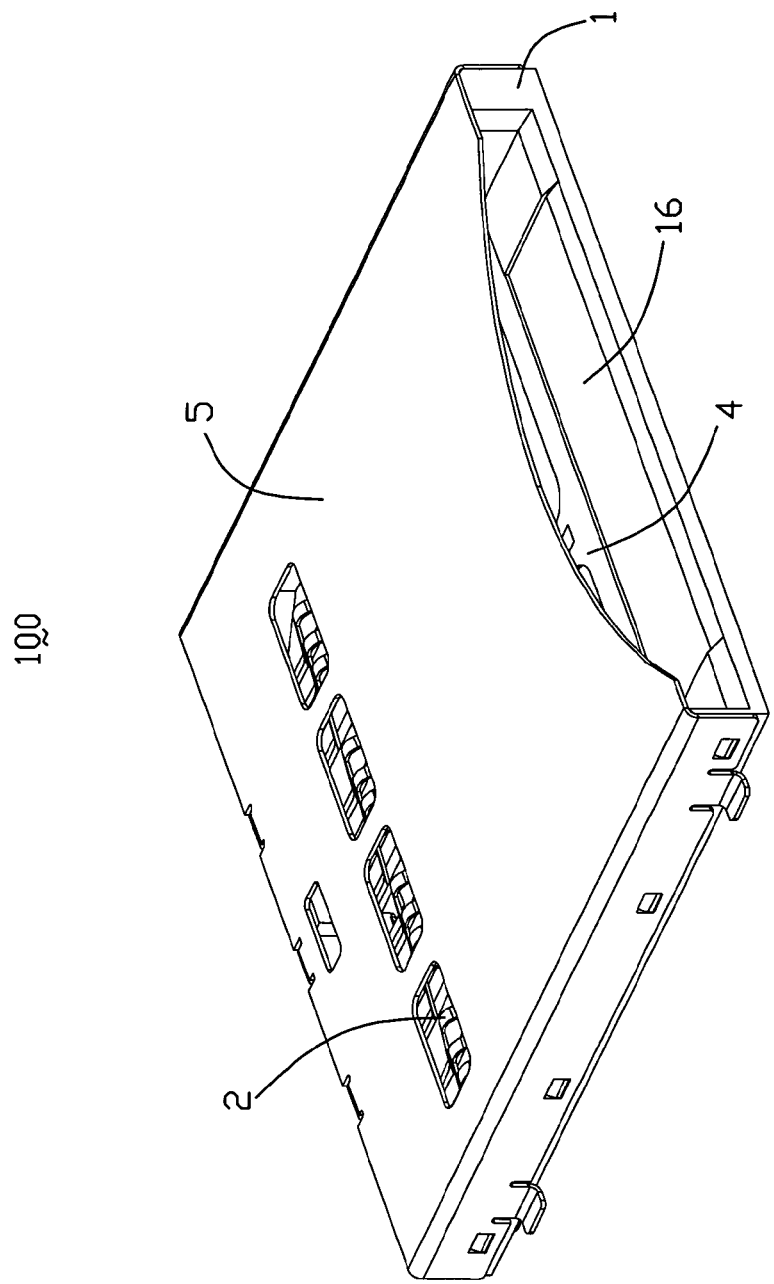
FIG. 1 is a perspective view of a memory card connector according to a preferred embodiment of the present invention.
Figure 2:
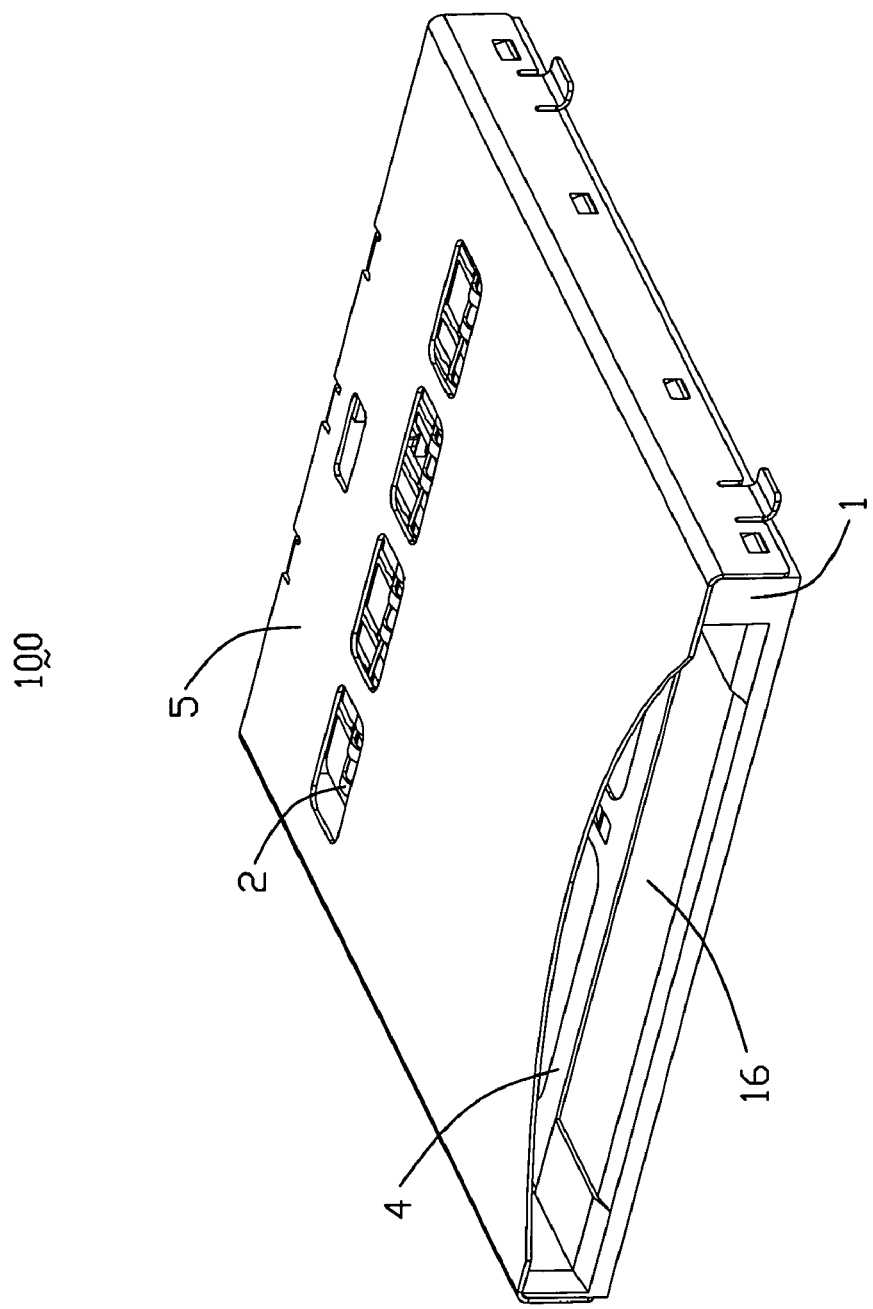
FIG. 2 is another perspective view of the memory card connector, but viewed from another aspect.
Figure 4:
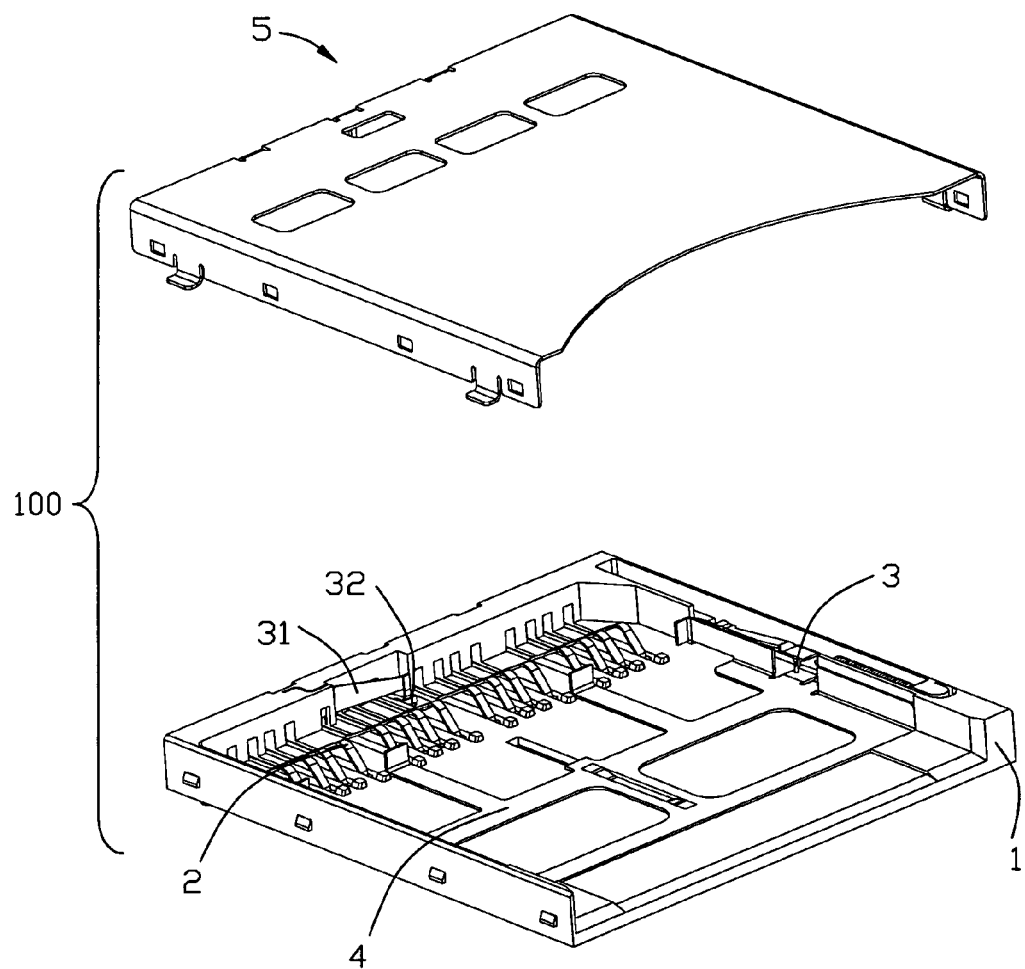
FIG. 4 is another part exploded perspective view of the memory card connector similar to FIG. 3, while taken from another aspect.
Figure 9:
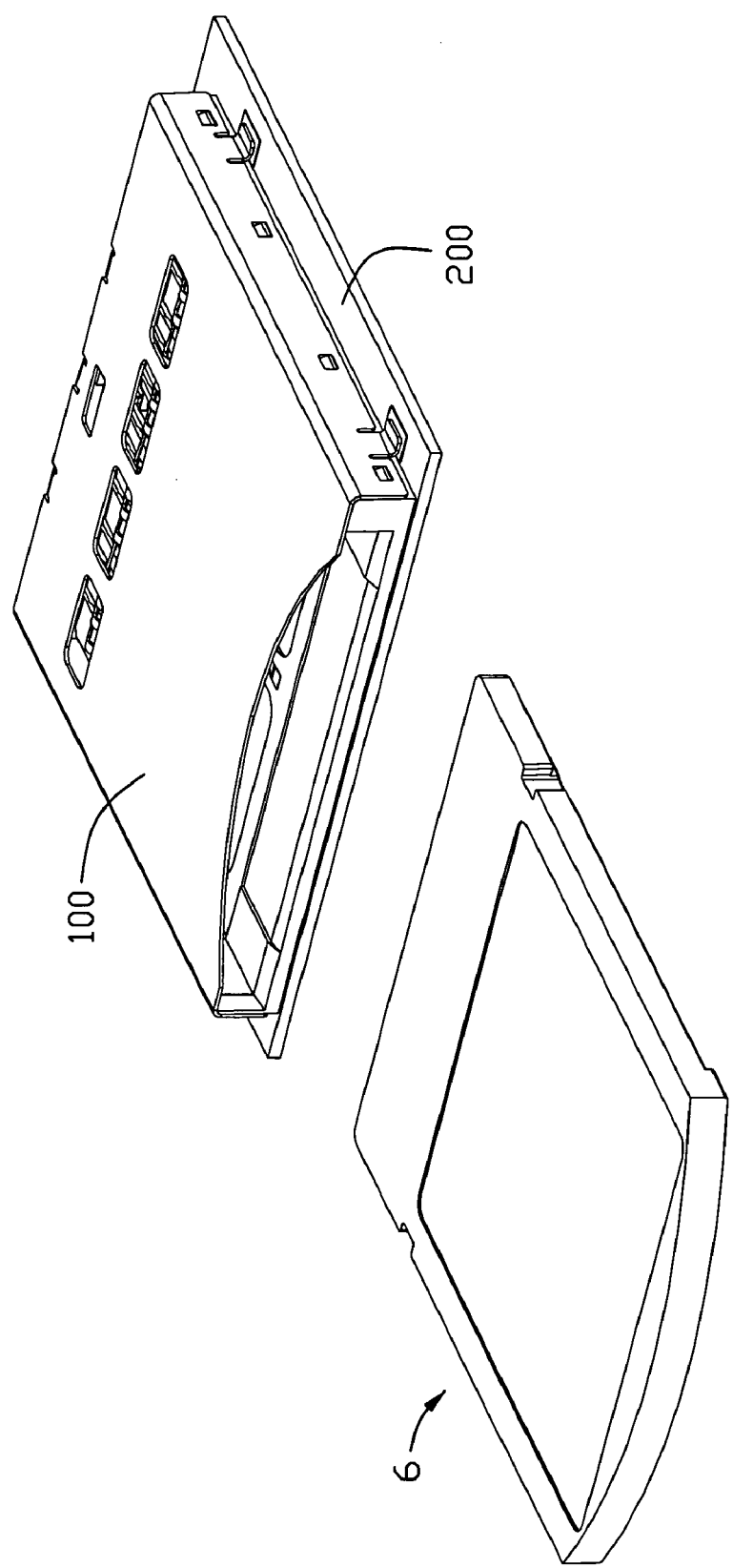
FIG. 9 is a perspective view of the memory card connector mounted on a printed circuit board (PCB) showing a memory card detached from the memory card connector.

Referring to FIGS. 1, 4 and 9, a memory card connector 100 mounted on a PCB 200 (shown in FIG. 9) is disclosed for receiving a memory card 6. The memory card connector 100 includes an insulative housing 1, a plurality of contacts 2 retained in the insulative housing 1, a pair of switch contacts 3, a card ejection mechanism 4 and a metal shell 6 covering the insulative housing 1.

Figure 3:
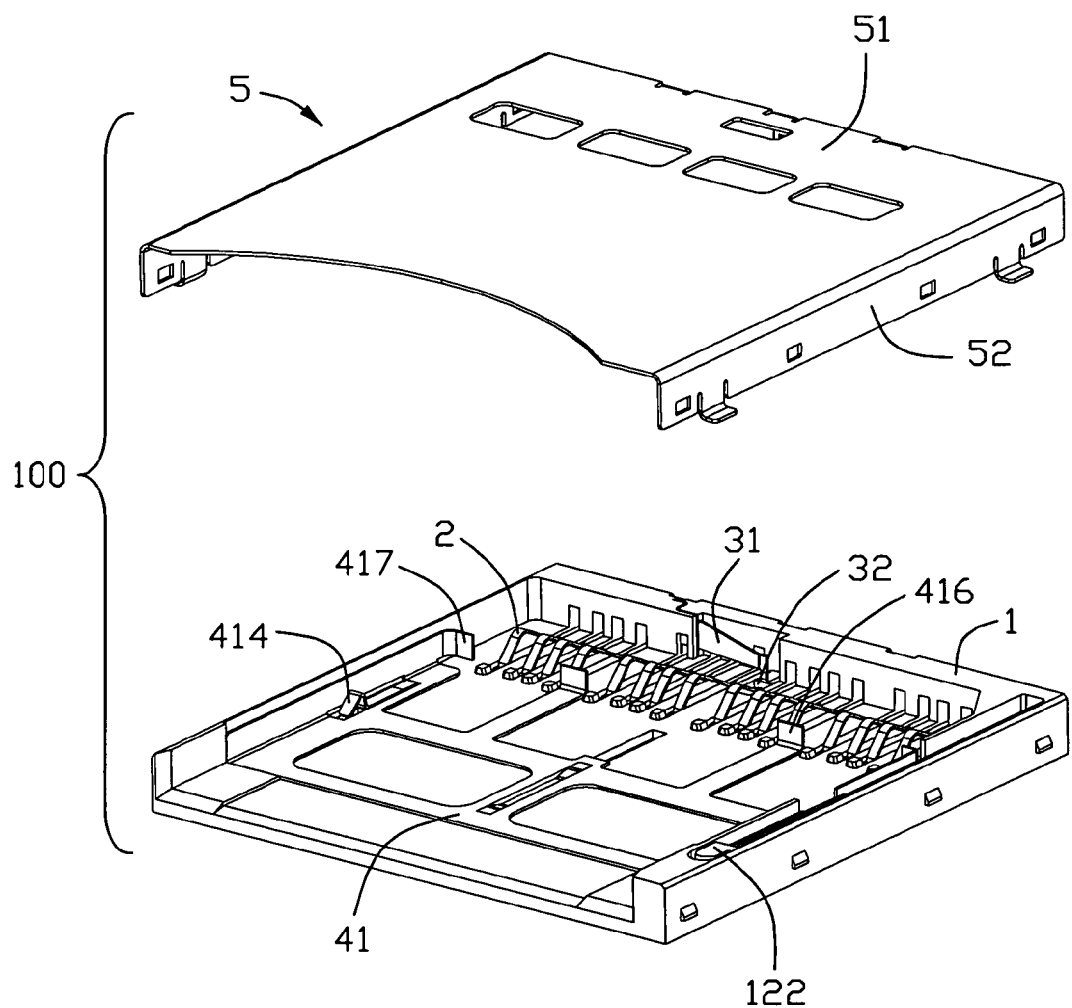
FIG. 3 is a part exploded perspective view of the memory card connector.
Figure 6:
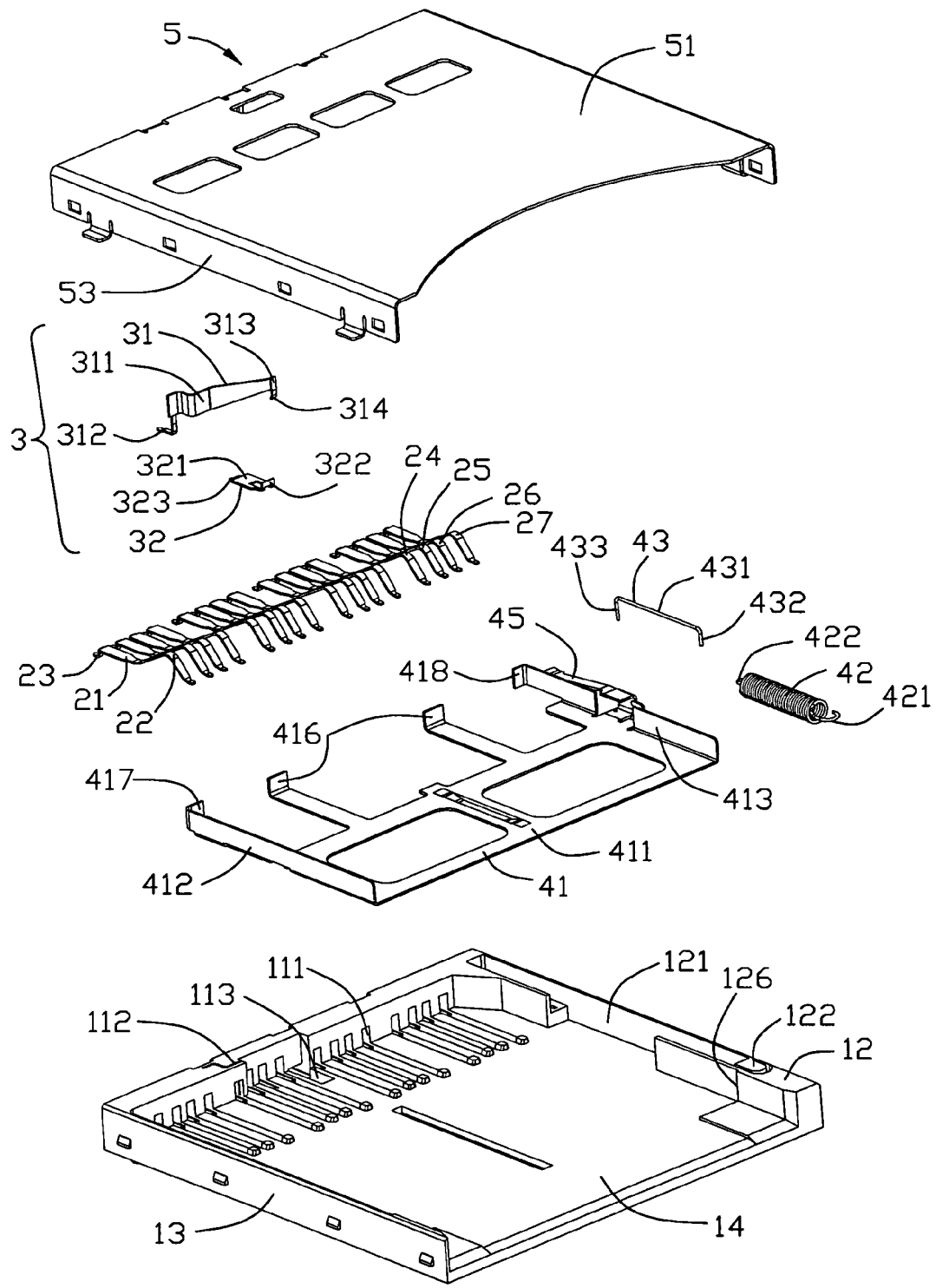
FIG. 6 is another exploded view of the memory card connector similar to FIG. 5, while taken from another aspect.

Referring to FIGS. 3 and 6, the insulative housing 1 includes a rear wall 11, a pair of first and second sidewalls 12, 13 extending forwardly from lateral sides of the rear wall 11, and a bottom wall 14 connecting the rear wall 11 and the pair of first and second sidewalls 12, 13. A card receiving cavity 16 is disposed between the first and the second sidewalls 12, 13, and located over the bottom wall 14. The rear wall 11 includes a plurality of passageways 111 for mounting the contacts 2 and a plurality of first and second mounting slots 112, 113 for mounting the switch contacts 3. The passageways 111 and the second mounting slots 113 further extend forwardly to the bottom wall 14. The first side wall 12 defines a chamber 121 communicating with the card receiving cavity 16 for mounting the card ejection mechanism 4. The insulative housing 1 includes a retaining block 122 at one end of the chamber 121 and a heart-shaped cam 123 (shown in FIG. 7) at the other end of the chamber 121. The bottom wall 14 includes a plurality of raised portions at the front of the passageways 111 for preventing wrong cards from being inserted into the card receiving cavity 16. The first and the second side walls 12, 13 respectively define a first and second step portions 126, 136 for positioning the card ejection mechanism 4 in an original position.

Figure 5:
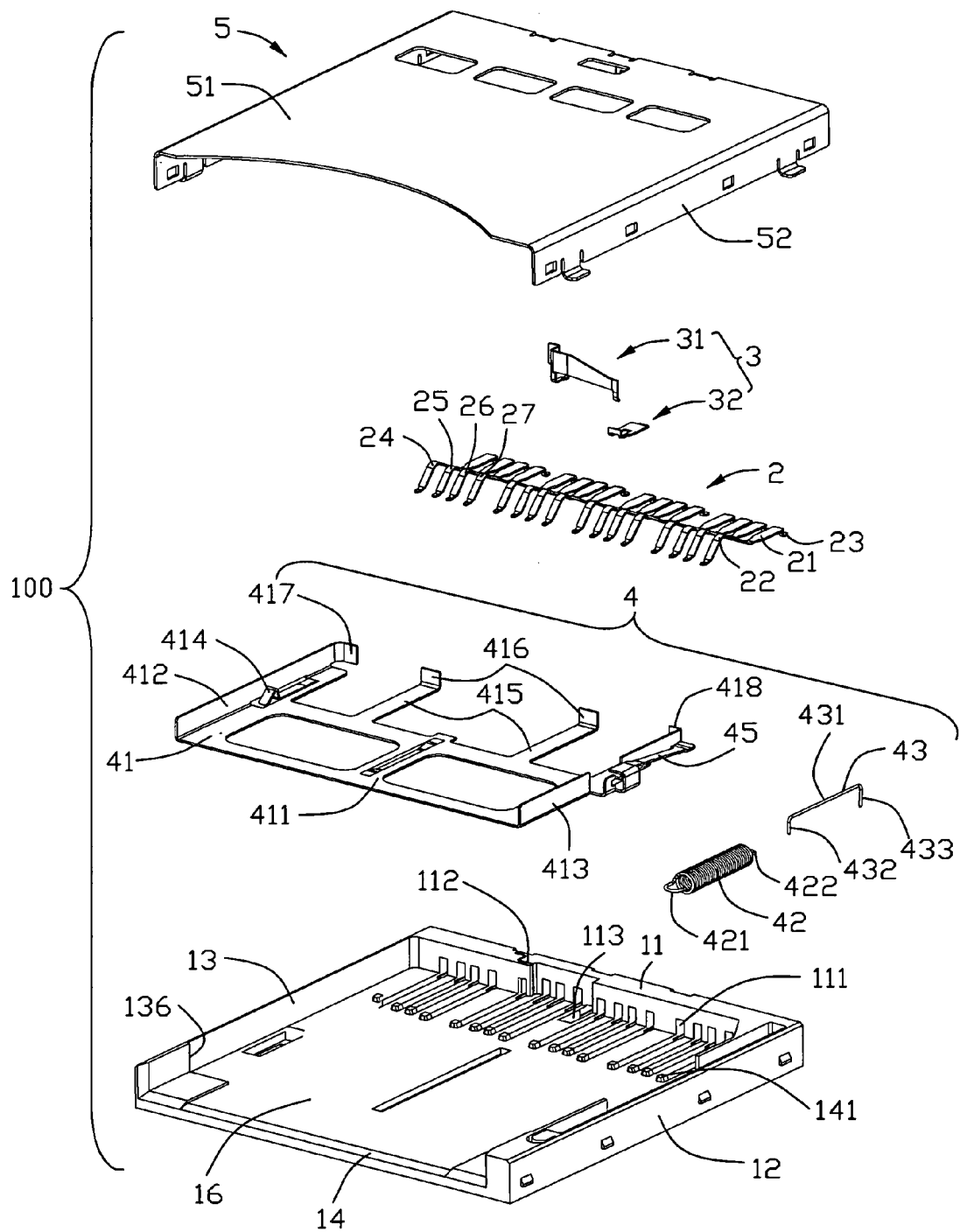
FIG. 5 is an exploded view of the memory card connector.

Referring to FIGS. 3 to 7, the contacts 2 are arranged in a single line along a transverse direction perpendicular to a front-to-rear direction. The contacts 2 are divided into four contact groups with each contact group having four contacts 2. The four contacts 2 of each contact group include a grounding contact 24, a first signal contact 25, a second signal contact 26 and a power contact 27 in turn as shown in FIG. 5. The four contact groups are of the same contact arrangement and are similar to the USB standard. Each contact group is adapted for transmitting USB or similar-USB signals. Way of USB signal transmission is used to memory card connectors in order to improve high-speed signal transmission. As a result, the memory card connector 100 of the present invention can also be called USB card connector. A space between the adjacent two contact groups is much larger than that of the adjacent two contacts in each contact group. Each contact 2 includes a retaining portion 21 received in the passageways 111, a flexible contact portion 22 extending from the retaining portion 21 and a tail portion 23 extending beyond the rear wall 11 to be soldered to the PCB 200. The contact portions 22 protrude into the card receiving cavity 16 for mating with the memory card 6.

The switch contacts 3 include a first switch contact 31 and a second switch contact 32 detachably mating with the first switch contact 31 determined by insertion positions of the memory card 6. The first switch contact 31 includes a first mounting portion 311 retained in the first mounting slot 112, a first soldering portion 312 extending from the first mounting portion 311, and a spring arm 313 extending from the first mounting portion 311. The spring arm 313 further includes a first contact section 314 at a distal end thereof.

The second switch contact 32 includes a second mounting portion 321 retained in the second mounting slot 113, a second soldering portion 323 and a second contact section 322 extending from opposite ends of the second mounting portion 321. The first contact section 314 normally attaches to the second contact section 322 without insertion of the memory card 6 into the card receiving cavity 16.

Figure 10:
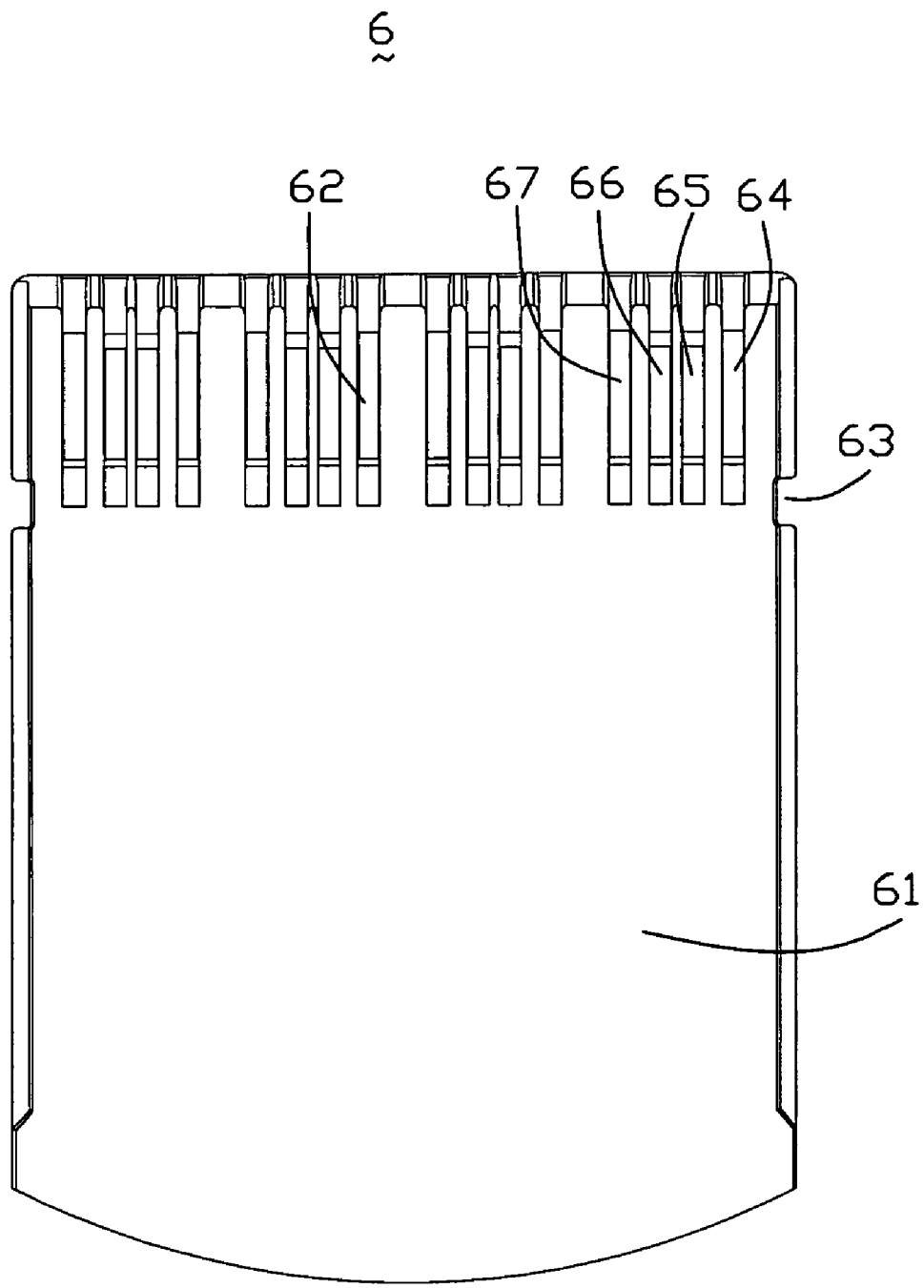
FIG. 10 is a bottom view of the memory card showing metal pad arrangement thereof.

The card ejection mechanism 4 comprises a slider 41, an elastic member which is a spring 42 in the preferred embodiment and a link rod 43. The slider 41 is stamped from metal sheet and includes a body portion 411 and a pair of first and second side portions 413, 412 extending upwardly from lateral sides of the body portion 411. The body portion 411 includes an elastic raised card lock 414 adjacent to the second side portion 412 for abutting against a notch 63 (shown in FIG. 10) of the memory card 6. The slider 41 further includes a pair of separate extensions 415 extending backwardly from the body portion 411. Each extensions 415 includes a raised actuation portion 416 located in the card receiving cavity 16 to abut against a front end of the memory card 6 in order that the slider 41 can be driven by the memory card 6 along the front-to-rear direction. The first and the second side portions 413, 412 both includes an abutting sections 417, 418 sidewardly extending into the card receiving cavity 16 for abutting against the memory card 6. The spring 42 includes one end 421 abutting against the retaining block 122 and the other end 422 fixed to the first side portion 413 of the slider 41. The link rod 43 includes a middle portion 431, a first hook 432 and a second hook 433 downwardly bending from opposite ends of the middle portion 431. The first hook 432 is fixed to the first side portion 413 for retaining purpose. The second hook 433 is moveable in the heart-shaped cam 123. The working theory of the card ejection mechanism 4 is obvious to those of ordinary skill in the art, so the detailed description is omitted hereinafter.

The metal shell 5 is stamped from a metal sheet and includes a top wall 51 and a pair of bending portions 52, 53 bending downwardly from lateral edges of the top wall 61 for abutting against the first and the second sidewalls 12, 13 of the insulative housing 1 so that the metal shell 5 can be retained on the insulative housing.

The memory card 6 includes a plurality of flat contact pads 62 on a bottom side 61 thereof. The contact pads 62 are divided into four contact groups with same arrangement. Each contact group includes four contact pads 62 designated with number 64, 65, 66, 67 for mating with contacts 24, 25, 26, 27 for signal transmission. The arrangement of the four contact pads 64, 65, 66, 67 is similar to contact arrangement of well-known USB flash disk. That is to say, the memory card 6 substantially similar to four side by side USB flash disks for large data storage and high speed signal transmission.

Figure 7:
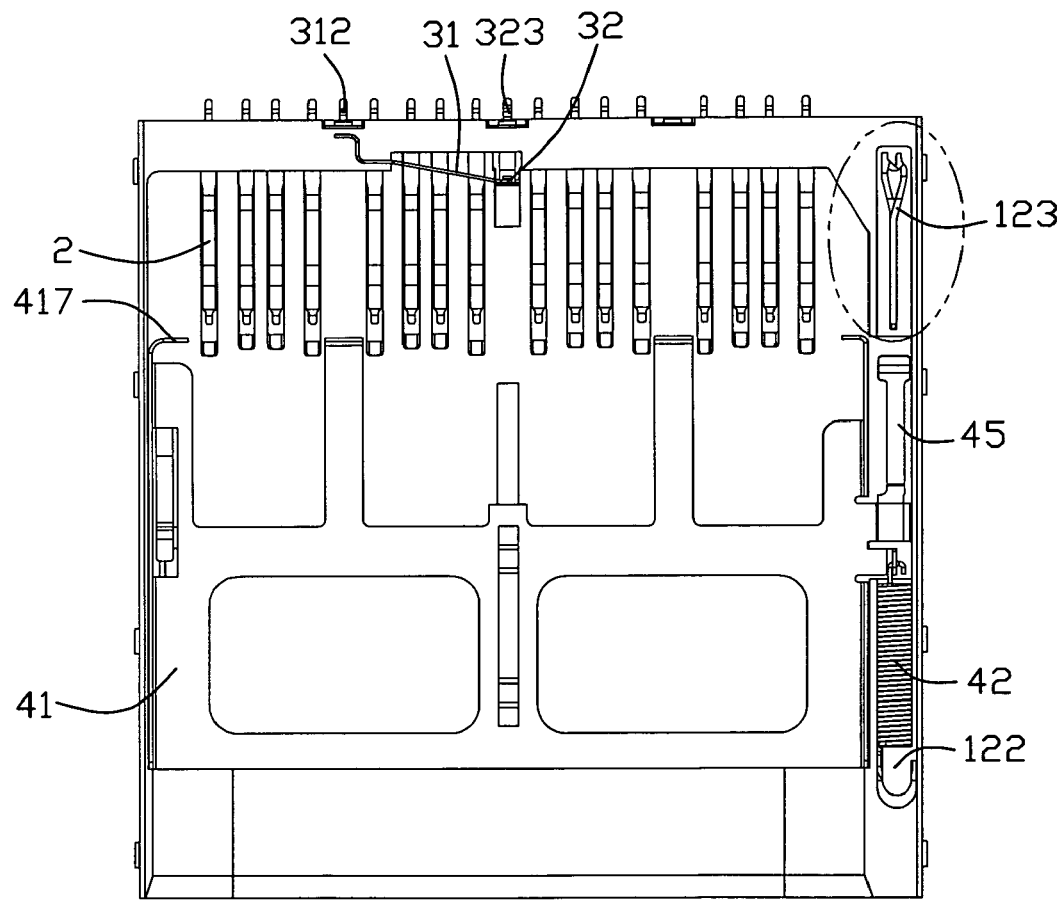
FIG. 7 is a top view of the memory card connector with a metal shell removed therefrom.
Figure 8:
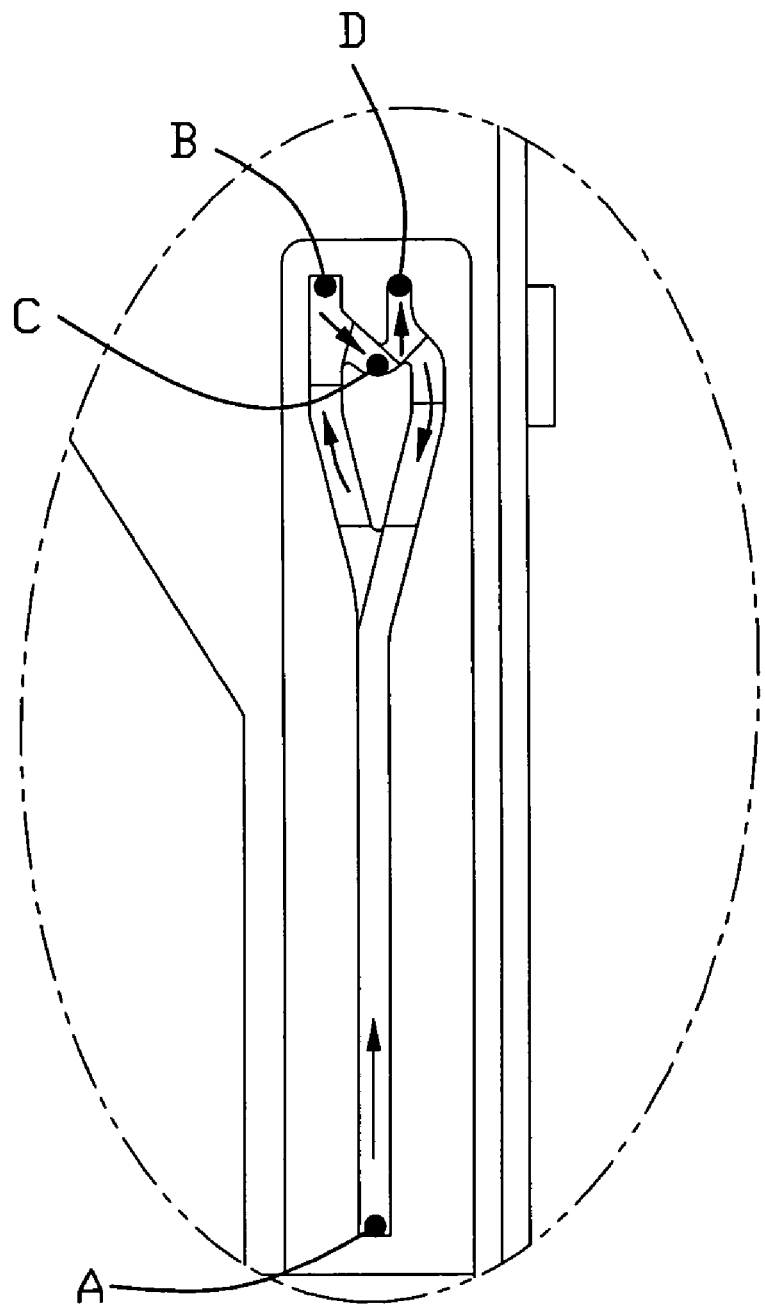
FIG. 8 is an enlarged view of the circle portion shown in FIG. 7.

Referring to FIGS. 7 and 8, when the memory card 6 is inserted into the card receiving cavity 16 of the insulative housing 1, the second hook 433 of the link rod 43 is moveable in the heart-shaped cam 123 along the arrow direction. In preliminary position, the second hook 433 is located at position A. With further insertion of the memory card 6, the front end of the memory card 6 abuts against the actuation portion 416 and the card lock 414 recessed into the notch 63 of the memory card 6. Then, the slider 41 is driven by the memory card 6 and moveable along the front-to-rear direction towards the rear wall 11. When the memory card 6 is deepest inserted into the card receiving cavity 16 and the second hook 433 is located at position B, the spring arm 313 is driven by the memory card 6 in condition that the first contact section 314 disengages with the second contact section 322. Then, release the memory card 6 and the second hook 433 withdraws to position C which is a working position of the memory card 6. In this condition, the first contact section 314 engages with the second contact section 322 once again. It is easy to understand that when the second hook 433 locates in different positions B and C, the mating status of the switch contacts 3 are different. In detail, when the second hook 433 locates at position B, a first signal change indicates that the memory card 6 is inserted into the card receiving cavity 16. When the second hook 433 locates at position C, the second signal change indicates that the memory card 6 reaches its final working position. It is useful for such different signal changes when the memory card 6 reaches its final working position.

Similarly, when the memory card 6 is going to withdraw from the card receiving cavity 16, firstly, the memory card 6 is pushed to reach the deepest insertion again under a condition that the second hook 433 locates at the position D. Under this circumstance, the switch contacts 3 are driven from "on" to "off". And then, when the memory card 6 is fully withdraw from the card receiving cavity 16, the switch contacts 3 recover to their normal "on" status. That is to say, when the memory card 6 is going to withdraw from the memory card connector 100, there is also a signal change to show that.

As discussed above, the switch contacts 3 of the present invention can give signal changes both when the memory card 6 is going to locate at its final working position and when the memory card 6 is going to withdraw from the card receiving cavity 16. Such signal changes may given indications whether the electronic device can establish data transmission with the memory card 6, or the data transmission must be intermitted in order to protect data of the memory card 6 when the memory card 6 is going to withdraw from the card receiving cavity 16.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. For example, the tongue portion is extended in its length or is arranged on a reverse side thereof opposite to the supporting side with other contacts but still holding the contacts with an arrangement indicated by the broad general meaning of the terms in which the appended claims are expressed.

What is claimed is:

1. A memory card connector for receiving a memory card, comprising:
    an insulative housing defining a card receiving cavity; a plurality of contacts with contact portions protruding to the card receiving cavity; and
    a pair of switch contacts at the rear of the card receiving cavity, the switch contacts including a first switch contact and a second switch contact detachably engaging with each other and determined by insertion depths of the memory card, the pair of switch contacts being of a first status when the memory card is located in a deepest insertion position of the card receiving cavity, and the pair of switch contacts being of a second status different from the first status when the memory card is located in a final working position;
    wherein the first status is a disconnection status in condition that the first switch contact is separated from the second switch contact, and the second status is a connection status in condition that the first switch contact abuts against the second switch contact.

2. The memory card connector according to claim 1, further comprising a metal shell covering the insulative housing, the metal shell comprising a top wall covering card receiving cavity and a pair of bending portions extending from the top wall to abut against the pair of first and second side walls.

3. The memory card connector according to claim 1, wherein the first and the second switch contacts connect with each other at an original unload position when the memory card is not inserted into the card receiving cavity.

4. The memory card connector according to claim 3, wherein during removal of the memory card from the final working position to the original unload position, the first and the second switch contacts being driven to separated from each other and recovering to connect with each other at the original unload position.

5. The memory card connector according to claim 4, wherein during removal of the memory card from the final working position to the original unload position, the memory card is firstly driven to another position deeper than the final working position in order to make the first and the second switch contacts separate from each other.

6. The memory card connector according to claim 1, wherein the contacts are divided into first and second contact groups with same contact arrangement in condition that each the first or the second contact group comprises four contacts for transmitting USB or similar-USB signals; and wherein a space between the first and the second contact groups is much larger than that of the adjacent two contacts in each the first or the second contact group.

7. The memory card connector according to claim 6, wherein the insulative housing comprises a rear wall and a pair of first and second side walls extending forwardly from the rear wall, and a bottom wall connecting the pair of side walls, the card receiving cavity being disposed between the pair of first and second side walls.

8. The memory card connector according to claim 7, wherein the bottom wall includes a plurality of raised portions located forward distal ends of the contact portions in order to prevent wrong insertion of other cards into the card receiving cavity.

9. The memory card connector according to claim 7, further comprising a card ejection mechanism which includes a slider mounted on the bottom wall, a spring and a link rod mating with the slider, the spring including one end abutting against the insulative housing and the other end abutting against the slider, and wherein the insulative housing defines a heart-shaped cam, and the link rod comprises one hook fixed to the slider and the other hook movable in the heart-shaped cam.

10. The memory card connector according to claim 9, wherein the link rod comprises a middle portion connecting the one hook and the other hook, and the slider comprises an integral press portion pressing the middle portion.

11. The memory card connector according to claim 9, wherein the slider is stamped from a metal sheet and comprises a pair of first and second side portions perpendicular to the main portion, each of the first and the second side wall defining a step portion abutting against the first and the side portions, respectively.

12. The memory card connector according to claim 9, wherein the slider comprises a main portion attached to the bottom wall of the insulative housing and an extension extending backwardly from the main portion, the extension being moveable in the space between the first and the second contact groups along a front-to-rear direction.

13. The memory card connector according to claim 12, wherein the extension comprises an actuation portion located in the card receiving cavity to abut against a front end of the memory card in order that the slider can be moveable along the front-to-rear direction.

14. A memory card connector for receiving a memory card, comprising:
    an insulative housing defining a card receiving cavity and a heart-shaped cam which includes a first rear portion, a locking portion and a second rear portion, the first and the second rear portions and the locking portion being located at three vertexes of a triangle;
    a plurality of contacts with contact portions protruding to the card receiving cavity for mating with the memory card;
    a card ejection mechanism which includes a slider, a spring and a link rod mating with the slider, the spring including one end abutting against the insulative housing and the other end abutting against the slider, the link rod comprising one hook fixed to the slider and the other hook movable in the heart-shaped cam; and a pair of switch contacts at the rear of the card receiving cavity in condition that the switch contacts are separated from each other when the other hook locates at the first and the second rear portions, and the switch contacts connect with each other when the other hook locates at the locking portion.

15. The memory card connector according to claim 14, wherein the contacts are divided into first and second contact groups with same contact arrangement in condition that each the first or the second contact group comprises four contacts for transmitting USB or similar-USB signals; and wherein a space between the first and the second contact groups is much larger than that of the adjacent two contacts in each the first or the second contact group.

16. The memory card connector according to claim 15, wherein the slider comprises a main portion and an extension extending backwardly from the main portion, and wherein the extension is moveable in the space between the first and the second contact groups along a front-to-rear direction.

17. An electrical card connector assembly for use with a card, comprising:
   an insulative housing defining a card receiving area with a plurality of terminals thereabouts under condition of said card being inserted into the card receiving area along a front-to-back direction;
   an ejector located beside the card receiving area and defining a card working position and a card transition position, where the card can not stay, behind said card working position where the card can rest in a working condition; and
   at least one switch contact having an actuation point located at a rear region of the card receiving area,
   another switch contact to cooperate with said at least one switch contact to form an on-and-off status, wherein
   said rear region is located in a range between the card working position and the card transition position.

\* \* \* \* \*